US008749820B2

(12) United States Patent
Nakajima

(10) Patent No.: US 8,749,820 B2
(45) Date of Patent: Jun. 10, 2014

(54) IMAGE FORMING APPARATUS THAT STORES PLURAL PRINT JOBS, CONTROL METHOD AND PROGRAM THEREOF

(75) Inventor: Yasuki Nakajima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 895 days.

(21) Appl. No.: 12/914,945

(22) Filed: Oct. 28, 2010

(65) Prior Publication Data
US 2011/0102839 A1  May 5, 2011

(30) Foreign Application Priority Data
Nov. 4, 2009  (JP) ................................ 2009-253061

(51) Int. Cl.
*G06F 3/12*  (2006.01)
(52) U.S. Cl.
USPC ........................................................ 358/1.15
(58) Field of Classification Search
CPC ............ G06K 15/1821; G06K 15/184; G06K 15/1856; G06K 15/1861; G06K 15/1865; G06K 15/1886; G06K 15/1881
See application file for complete search history.

(56) References Cited

U.S. PATENT DOCUMENTS

| 6,919,972 | B2 | 7/2005 | Kumada et al. |
| 7,256,906 | B2 | 8/2007 | Nakajima |
| 8,542,932 | B2 * | 9/2013 | Furuta ........................... 382/232 |
| 2002/0026463 | A1 | 2/2002 | Utsunomiya |
| 2011/0102839 | A1 * | 5/2011 | Nakajima .................... 358/1.15 |

FOREIGN PATENT DOCUMENTS

| JP | 2002-137462 | 5/2002 |
| JP | 2002-187317 | 7/2002 |
| JP | 2004-284281 | 10/2004 |

* cited by examiner

Primary Examiner — Mark Zimmerman
Assistant Examiner — Mesfin Getaneh
(74) Attorney, Agent, or Firm — Fitzpatrick, Cella, Harper & Scinto

(57) ABSTRACT

In a network printer, in order to handle tincture variations, if all the waiting print jobs are held in two types of formats, that is, PDL and half-tone print data generated by expanding the PDL, a required memory capacity is increased. Moreover, if the tincture variations occurs, all the waiting print jobs need rendering again. When the print job is to be stored, the received PDL is expanded, continuous-tone data is generated, and the continuous-tone data is JPEG-compressed. If a compression rate is high, the print job (print image data) is stored in the JPEG format. Even if the compression rate is low, storage of only the PDL or of PDL and the half-tone print data is selected according to expansion time of the PDL.

8 Claims, 13 Drawing Sheets

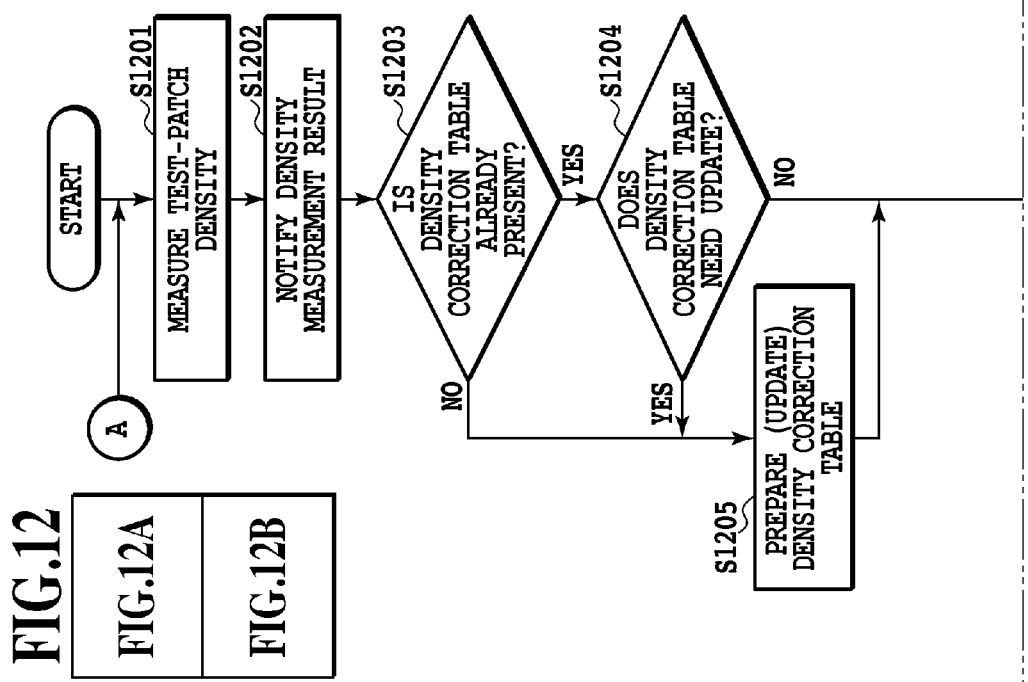

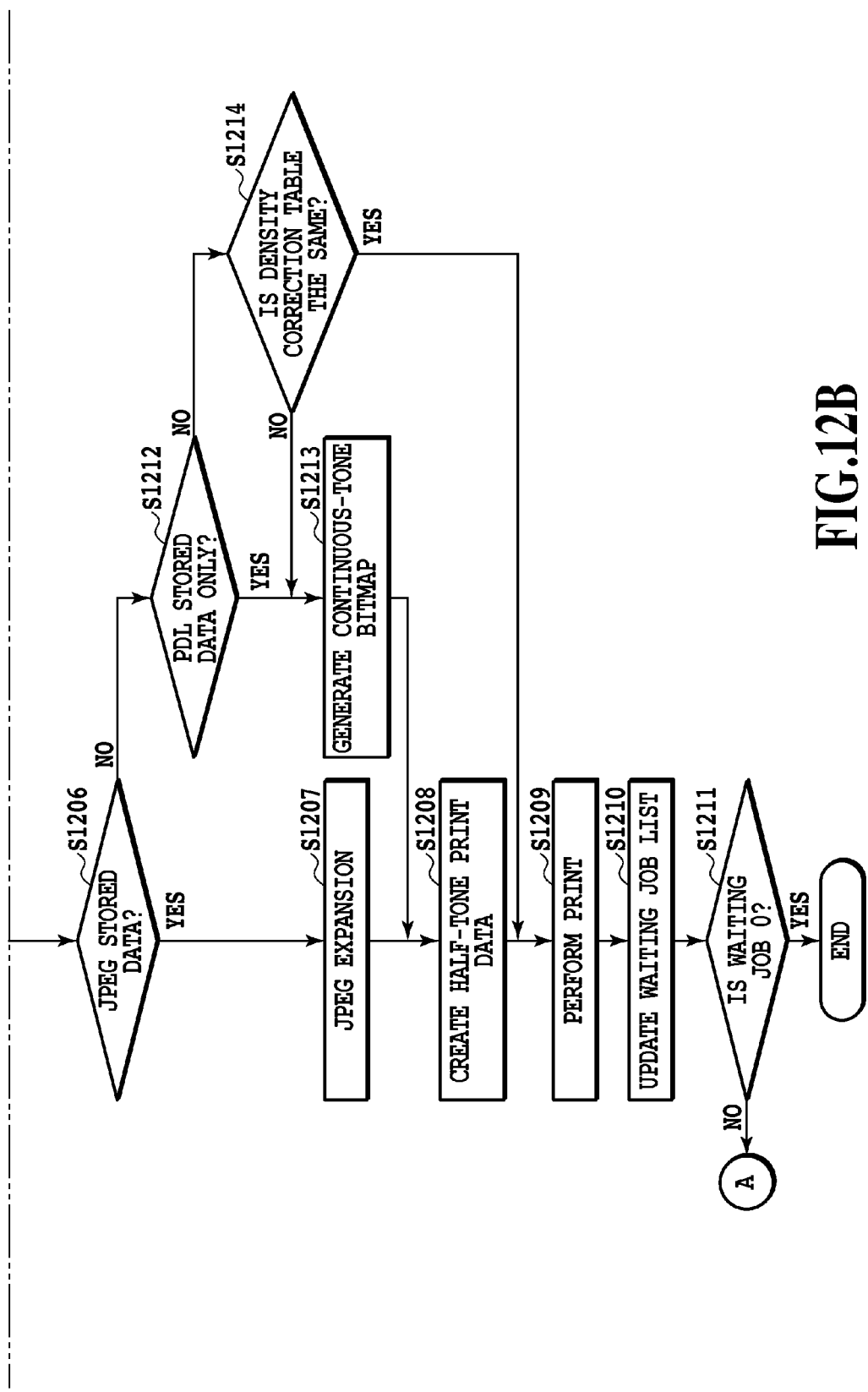

IMAGE FORMING APPARATUS THAT STORES PLURAL PRINT JOBS, CONTROL METHOD AND PROGRAM THEREOF

BACKGROUND OF THE INVENTION

1. Field of the Invention

The present invention relates to an image forming apparatus that stores plural print jobs, a control method and a program thereof.

2. Description of the Related Art

There has been a technology that, in order to reduce power consumed by a printer device, a print job received from a host computer is held once in the printer device and then, a plurality of held print jobs are printed and processed altogether (See Japanese Patent Laid-Open No. 2004-284281). Also, there is a technology that, in order to keep secret of a print document, print processing is not started immediately after the printer device receives a print job. That is, there is a technology that immediately after the reception of the print job, only analysis or rendering processing of the print job is performed, and if authentication is obtained by an authentication operation of password input by a user and the like in the printer device, the printing processing on a recording paper is performed (See Japanese Patent Laid-Open No. 2002-187317). As mentioned above, there is a printer device that stores a print job received from a host computer once in the printer device and does not start printing processing immediately.

On the other hand, there is a printer device that corrects a change in an output image involved in a change of an environment such as a temperature, humidity and the like and corrects density in order to supply stable images. Also, in the case of an electrophotographic printer device, density correction is made in order to correct a change/deterioration in a visible image involved in deterioration of consumable supplies such as a photoconductive drum, toner of a toner cartridge and the like and to supply stable images. The print job received in Page Description Language (hereinafter called "PDL") is subjected to rendering processing in a print device in general, and continuous-tone bitmap is generated. Then, bitmap data for printing subjected to the above-described density correction processing (half-tone bitmap, for example) is generated, and printing on a recording paper is performed on the basis of this bitmap data for printing.

As a technology to improve performance of the printing processing considering the above density correction, a technology in Japanese Patent Laid-Open No. 2002-137462 is proposed. According to the proposal of Japanese Patent Laid-Open No. 2002-137462, instead of generation of bitmap data for printing from PDL for each printing processing, PDL and the bitmap data for printing generated in advance are both prepared. Then, a print device is proposed that, till the density correction processing is newly required, the bitmap data for printing is used, while if the density correction becomes necessary, the bitmap data for printing is generated again from the PDL.

However, if the technology described in Japanese Patent Laid-Open No. 2002-137462 is to be applied to a method of storing a job in a printer device once as disclosed in Japanese Patent Laid-Open No. 2004-284281 or Japanese Patent Laid-Open No. 2002-187317, the following problem would occur. That is, since the PDL and the bitmap data for printing need to be held for all the print jobs stored in the print device, a large capacity is required for a storage device. Moreover, if the density correction processing becomes necessary, the PDL of all the print jobs need to be rendered again. Since time required for the rendering processing is different depending on the image, waiting time for rendering is generated, which results in deterioration of print performance.

SUMMARY OF THE INVENTION

An image forming apparatus of the present invention includes a PDL data receiving unit configured to receive PDL data, a rendering unit configured to analyze the received PDL data and to generate a continuous-tone bitmap image, a time measuring unit configured to measure processing time of the rendering unit, a compression unit configured to compress the generated continuous-tone bitmap image and to output compressed image data, a first storing unit configured to store the compressed image data as a print waiting job if a compression rate of the outputted compressed image data is not more than a first threshold value, a second storing unit configured to store the PDL data as a print waiting job if the compression rate of the outputted compressed image data exceeds the first threshold value and if processing time measured by the time measuring unit is not more than a second threshold value, and a third storing unit configured to store a generated half-tone print data whose density is corrected from the continuous-tone bitmap image according to a measurement result of density characteristics of a printer engine and the PDL data as the print waiting job if the compression rate of the outputted compressed image data exceeds the first threshold value and if the processing time measured by the time measuring unit exceeds the second threshold value.

According to the present invention, by storing the job waiting for print in an optimal format, while a storage capacity when data is stored is reduced, performance during printing can be further improved.

Further features of the present invention will become apparent from the following description of exemplary embodiments (with reference to the attached drawings).

BRIEF DESCRIPTION OF THE DRAWINGS

FIG. 12 is a diagram showing the relationship of FIGS. 12A and 12B; and

FIGS. 12A and 12B are diagrams illustrating a flowchart of the print operation control during the strong power-saving mode in the printer device, which is the embodiment of the present invention.

DESCRIPTION OF THE EMBODIMENTS

A best mode for carrying out the present invention will be described below using the attached drawings.

Figure 1:
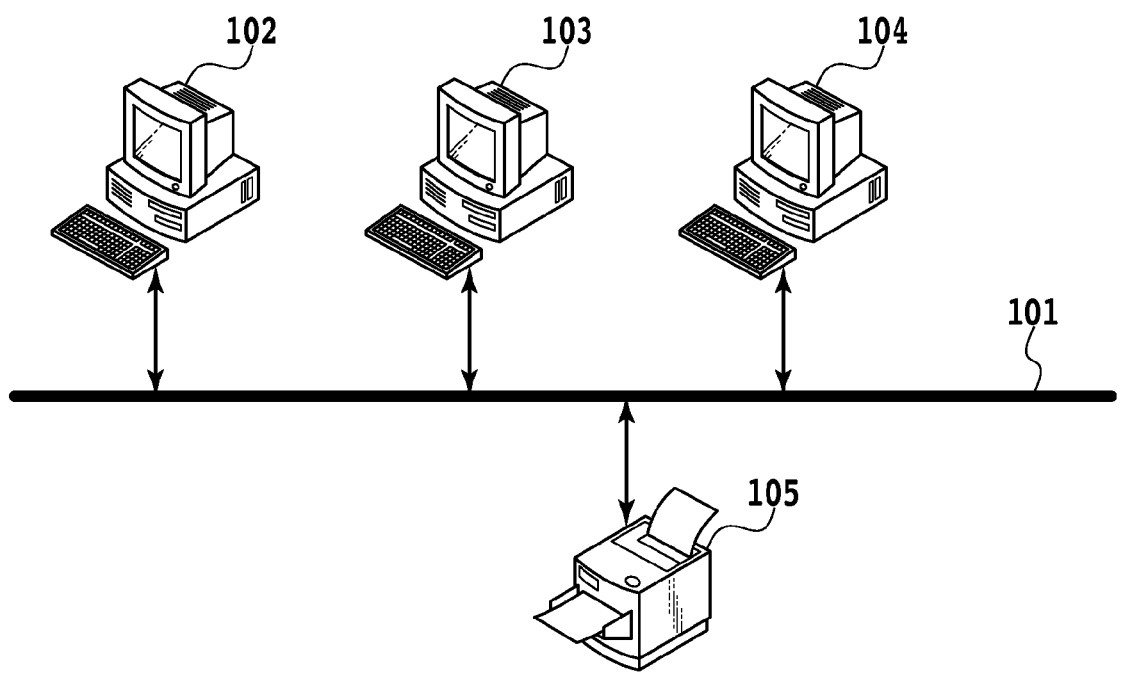
FIG. 1 is a configuration diagram of a print system in which a printer device (image forming apparatus) connected through a network in accordance with one embodiment.

FIG. 1 is a configuration diagram of a print system in which a printer device, which is an image forming apparatus of this embodiment, is connected through a network. To a network 101, computers 102, 103, and 104 and a printer device 105 are connected. The computers 102, 103, and 104 transmit a print job made up by data and a print request expressed in PDL to the printer device through the network 101. The printer device 105 performs print according to the print job received through the network 101. Also, the printer device 105 is provided with a power-saving mode, which will be described later.

Figure 2:
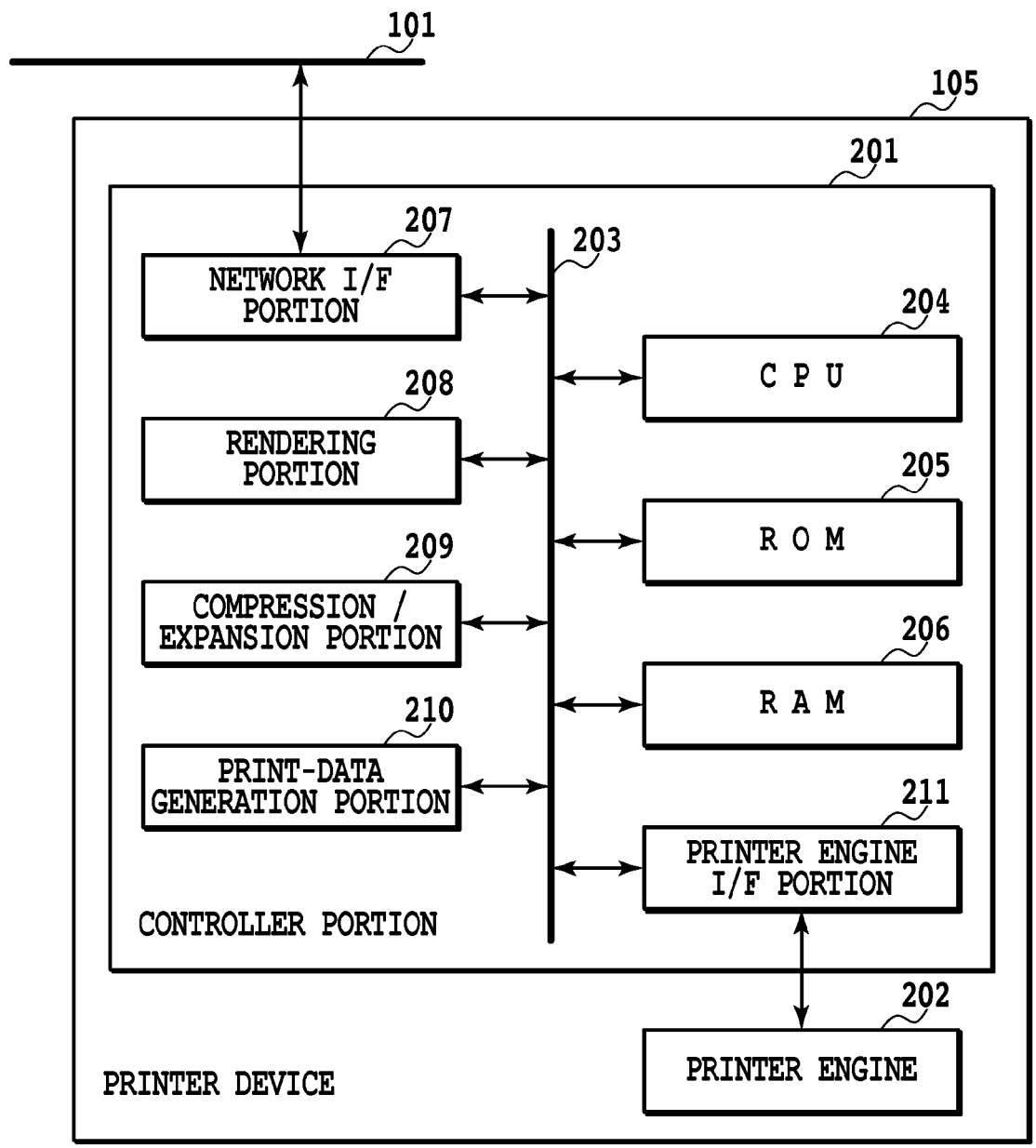
FIG. 2 is a block diagram for explaining an internal configuration of the printer device in accordance with one embodiment.

FIG. 2 is a block diagram for explaining an internal configuration of the printer device (image forming apparatus) 105 of this embodiment. The printer device 105 is roughly divided into a controller portion 201 and a printer engine 202. To an internal system bus 203, each block in the controller portion 201, which will be described later, is connected so as to perform data transmission/reception between each block. A CPU 204 controls an entire operation of the printer device 105. In a Read Only Memory (ROM) 205, a program describing an operation of the CPU 204 is stored. A Random Access Memory (RAM) 206 is a work area where the CPU 204 operates and various data such as PDL, print data and the like are stored. A network I/F portion 207 receives the print job transmitted from the computers 102 to 104 through the above-described network 101. A rendering portion 208 analyzes the PDL, which is the data received from the computers 102 to 104, generates various image objects according to an analysis result and expands the image objects to a continuous-tone bitmap image. The continuous-tone bitmap has 8-bit data per each pixel, for example. A compression/expansion portion 209 compresses the bitmap image expanded by the rendering portion 208 to data in the JPEG format. Also, the compression/expansion portion 209 expands the compressed data in the JPEG format and generates continuous-tone bitmap data. A print-data generation portion 210 performs correction processing of density characteristics, which will be described later, and generates half-tone print data to be transmitted to the printer engine 202. A printer engine I/F portion 211 performs transmission of the half-tone print data to the printer engine 202 and reception of test-patch reading density information required for the density correction processing from the printer engine 202.

Figure 3:
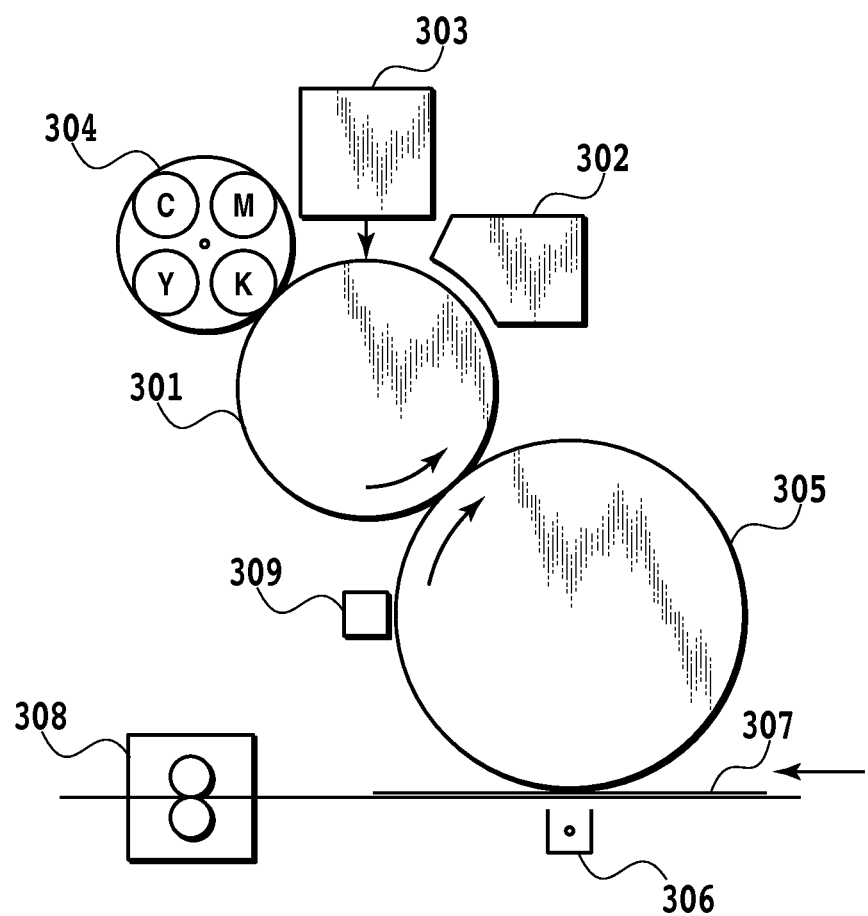
FIG. 3 is a sectional view illustrating an internal structure of a printer engine of the printer device in accordance with one embodiment.

FIG. 3 is a sectional view illustrating an internal structure of the printer engine of the printer device in this embodiment. A photoconductive drum 301 is charged by a charger 302. A laser unit 303 performs scan exposure by laser light according to the half-tone print data received from the controller portion 201 and forms an electrostatic latent image on the photoconductive drum 301. The electrostatic latent image is developed into a toner image by a toner supplied by a development unit 304. The development unit 304 includes four developers of yellow, magenta, cyan, and black. The development unit 304 makes a 1/4 rotation per rotation of an intermediate transfer drum 305 and performs a development process in the order of yellow, magenta, cyan, and black. The intermediate transfer drum 305 applies a voltage of a property opposite to that of the toner image developed on the photoconductive drum 301 so as to temporarily transfer the toner image from the photoconductive drum 301 onto the intermediate transfer drum 305. As mentioned above, the toner images sequentially developed in the order or yellow, magenta, cyan, and black are multi-transferred onto the intermediate transfer drum 305. A transfer unit 306 applies a bias of a property opposite to that of the toner image and transfers a color toner image on transfer paper 307. The toner image having been transferred onto the transfer paper 307 is heat-fixed by a fixing unit 308 and then, ejected to the outside of the printer device 105. A density sensor 309 is a sensor that measures a density of a toner image having been transferred onto the intermediate transfer drum 305.

Figure 4:
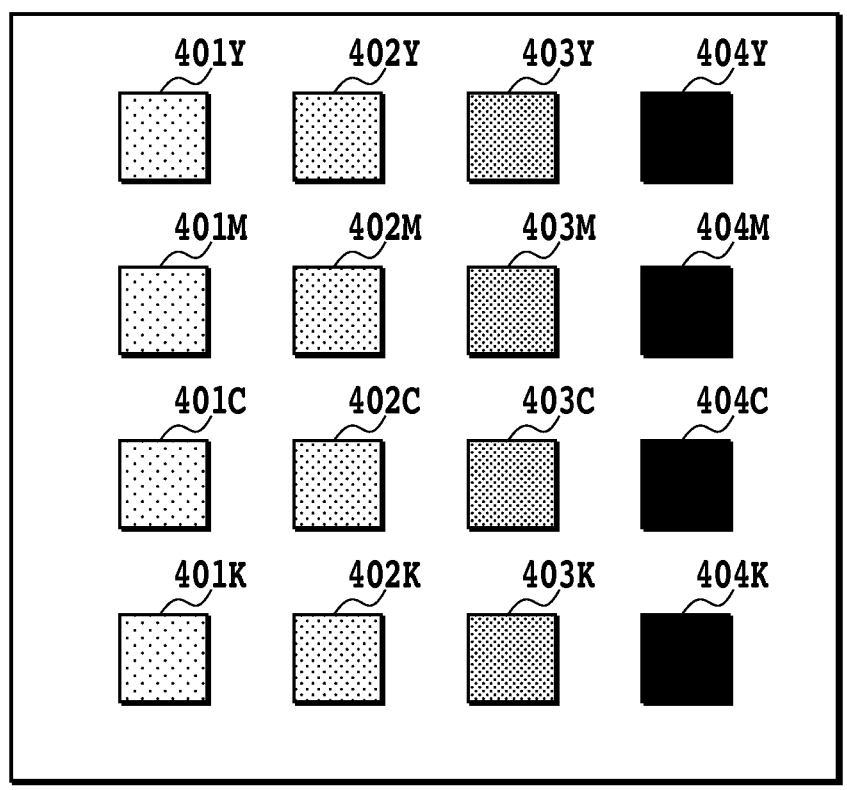
FIG. 4 is a diagram schematically illustrating a test patch image used by the printer device during density measurement in accordance with one embodiment.
Figure 5:
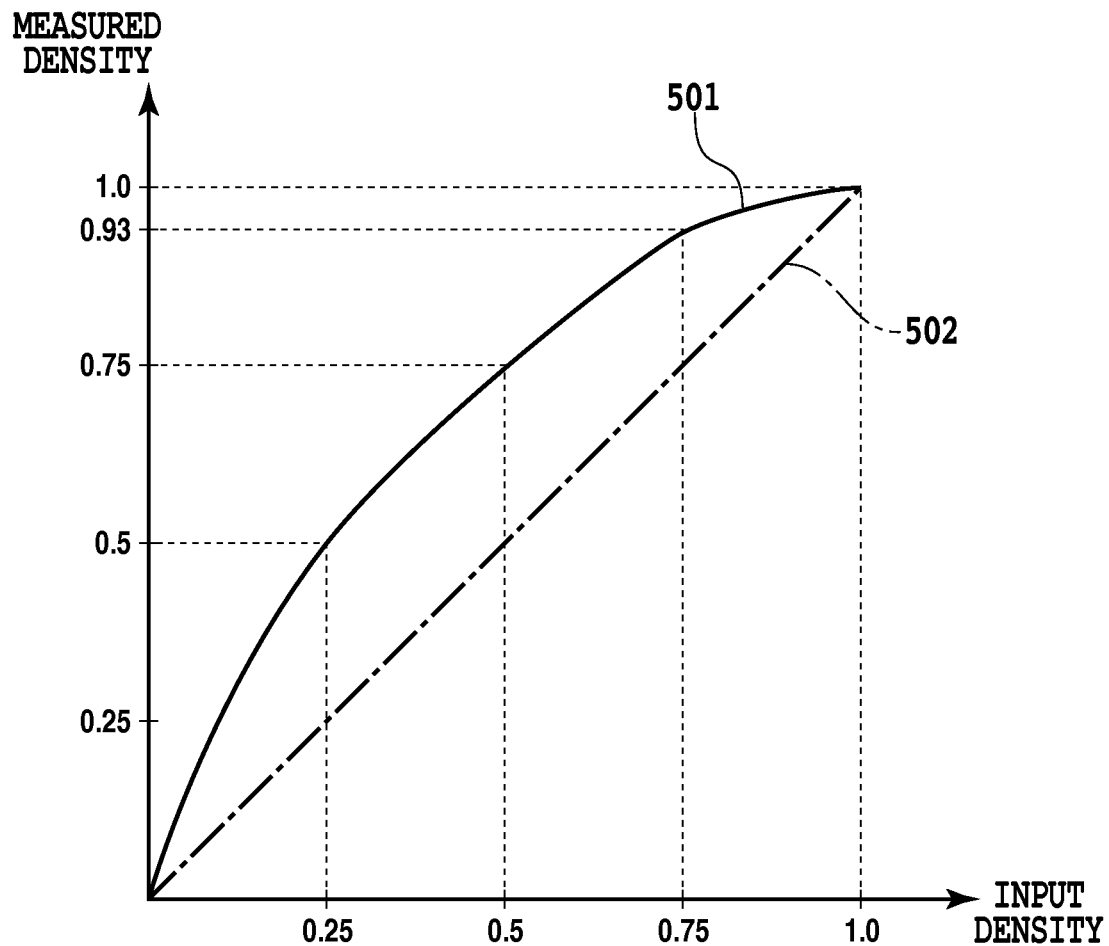
FIG. 5 is a graph schematically illustrating a relationship between input density and measured density of the printer device in accordance with one embodiment.
Figure 6:
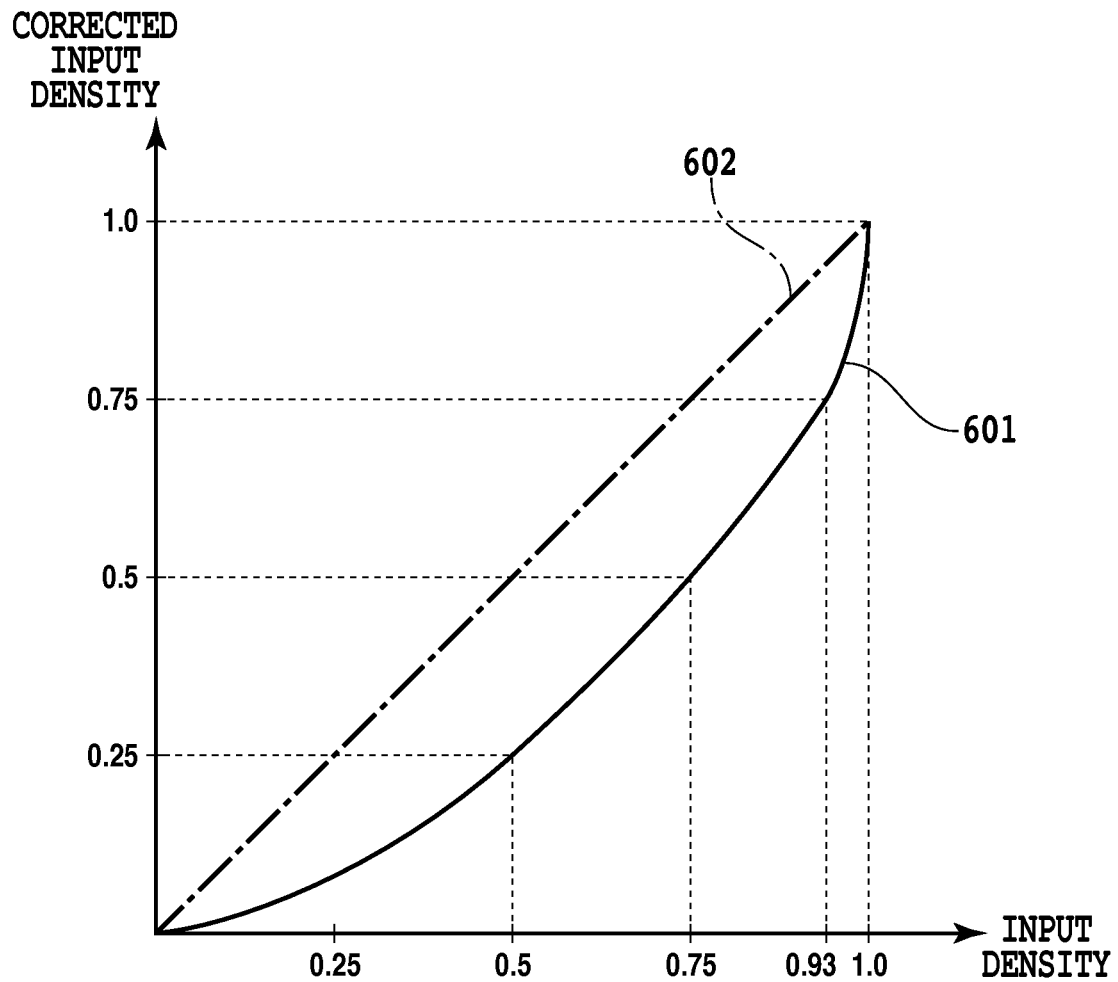
FIG. 6 is a graph schematically illustrating a relationship between input density and corrected input density of the printer device in accordance with one embodiment.

Subsequently, correction of density characteristics will be described using FIGS. 4, 5, and 6. FIG. 4 is a diagram schematically illustrating a test-patch image used during density measurement. Reference numeral 401X (X indicates any of Y (yellow), M (magenta), C (cyan), and K (black)) denotes a test patch generated as a toner image on the intermediate transfer drum by a pattern of input density 0.25. Similarly, reference numerals 402X, 403X, and 404X denote test patches generated when the input densities are 0.5, 0.75, and 1.0, respectively. If these test patches are read by the density sensor 309 and a result is made a measurement density (actually printed density), the relationship is obtained as a curve 501 in FIG. 5 (input density for the lateral axis and measured density on the vertical axis) for yellow, for example. As mentioned above, measurements for each color are made at four points, but this curve 501 is made into a function or a table by data collected by prior tests such as temperature, humidity and the like and obtained as in FIG. 5 from those values. Also, a broken line 502 expresses an ideal density that should be outputted to input density. According to the curve 501 obtained by the density measurement, if the input density of yellow is 0.25, 0.5, 0.75, and 1.0, the measured densities are 0.5, 0.75, 0.93, and 1.0, respectively. That is, if the input densities are 0.5, 0.75, 0.93, and 1.0 to the contrary, by performing input density correction and print with 0.25, 0.5, 0.75, and 1.0 as corrected input densities, an ideal output density can be obtained for the input density. That is, 0.5, 0.75, 0.93, and 1.0 can be obtained as the output densities. As mentioned above, the relationship between the input density and the corrected input density when density correction is made is shown in FIG. 6, and a curve indicating the relationship between the input density and the corrected input density is 601. As mentioned above, a test patch is formed on the intermediate transfer drum 305, the density of the test patch is measured, and a density correction table prepared from the measured density data is used so as to make density correction of an image and to perform print with an ideal density. Also, the density measurement operation of the test patch and the preparation of the density correction table described above are performed prior to print operation. Prior to print operation specifically means that prior to print processing of each job or prior to print processing with a predetermined number of pages as a unit. The detail will be described later. Moreover, depending on the density measurement result of the test patch, the density correction table does not have to be updated in some cases.

Figure 7:
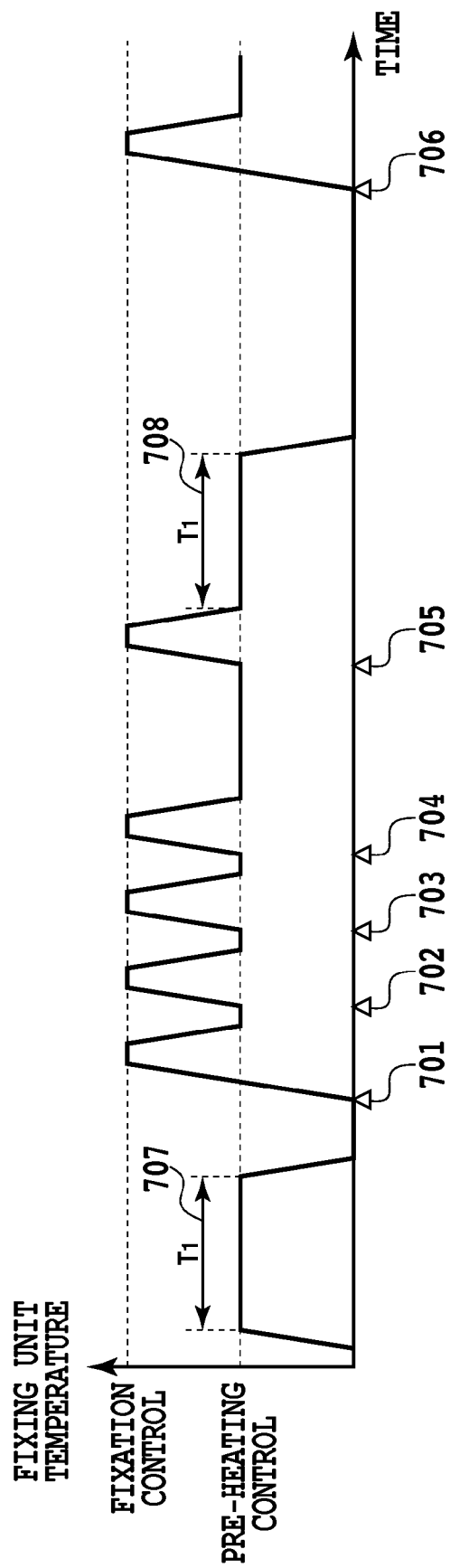
FIG. 7 is a diagram illustrating control temperature transition of a fixing unit during a weak power-saving mode in the printer device.

Subsequently, a power-saving mode in the printer device, which is an embodiment of the present invention, will be described in detail using FIGS. 7 and 8. The printer device 105 has two power modes, that is, a weak power-saving mode and a strong power-saving mode. Switching between these power modes is set by a user through an operation panel, not shown, on the printer device. This embodiment is useful when the strong power-saving mode is used, but the both power-saving modes will be described below in order to promote understanding. FIG. 7 shows control temperature transition of a fixing unit during the weak power-saving mode in the printer device, which is an embodiment of the present invention. Reference numerals 701 to 706 denote timings when a print job is received from the computer. In the weak power-saving mode, when a predetermined time (T1) indicated by 707 or more has elapsed since a stand-by state started, pre-heating of the fixing unit is turned off, by which power consumption is suppressed. Also, if a print job is received in the stand-by state in which pre-heating is off (print-job reception timing of 701 in the figure), control at a fixation temperature is started, and print is performed. As obvious from FIG. 7, in the weak power-saving mode, if a print job is received, a print operation is performed immediately without storing the print job. At 705, the print job is received, and after the print is performed, the stand-by state for the predetermined time (T1) expressed by 708 is continued, and then, pre-heating of the fixing unit is turned off.

Figure 8:
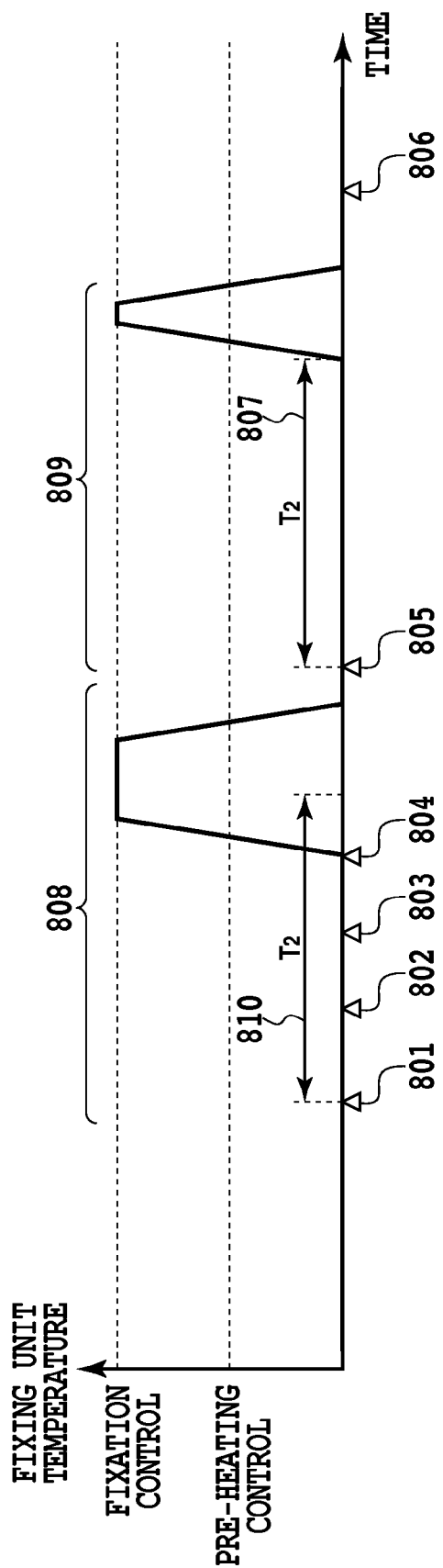
FIG. 8 is a diagram illustrating the control temperature transition of the fixing unit during a strong power-saving mode in the printer device, which is an embodiment of the present invention.

FIG. 8 shows the control temperature transition of the fixing unit in the strong power-saving mode in the printer device, which is the embodiment of the present invention. The strong power-saving mode is an operation mode in which the print operation is not started immediately after the print job is received but the print operation is performed altogether after the predetermined number of print jobs have been received and held. According to the strong power-saving mode, since the pre-heating held time of the fixing unit can be reduced, this is a power mode with higher power-saving effect than the above-described weak power-saving mode. In order to perform the print operation in the strong power-saving mode, there can be two cases. One of them is a case in which, in a state without a print waiting job, a print job is received and then, the predetermined number of print jobs (four print jobs in FIG. 8, for example) are received before a predetermined time (time indicated by T2 (810) in FIG. 8) has elapsed. This is expressed by a section 808 in FIG. 8. In the section 808, at a print-job reception timing 801, a print job is received in a state without a print waiting job, and print jobs 802, 803, and 804 are received before the predetermined time T2 has elapsed. As a result, immediately after the fourth print reception timing 804, the print operation is started, and the print relating to the print jobs 801, 802, 803, and 804, which are all the print waiting jobs, is performed. The other case is a case in which a print job is received in a state without a print waiting job and then, the predetermined time T2 (807) has elapsed without the number of received print jobs reaching the predetermined number (the above-described four print jobs). This is expressed by a section 809 in FIG. 8. A print job is received in a state without a print waiting job (timing 805 in the figure), no print job is received during the predetermined time T2, and after the predetermined time T2 has elapsed, the print 805, which has been a print waiting job, is performed. By such print control, the pre-heating is turned off except the print performance, and power consumption can be suppressed more than in the above-described weak power-saving mode.

Figure 9:
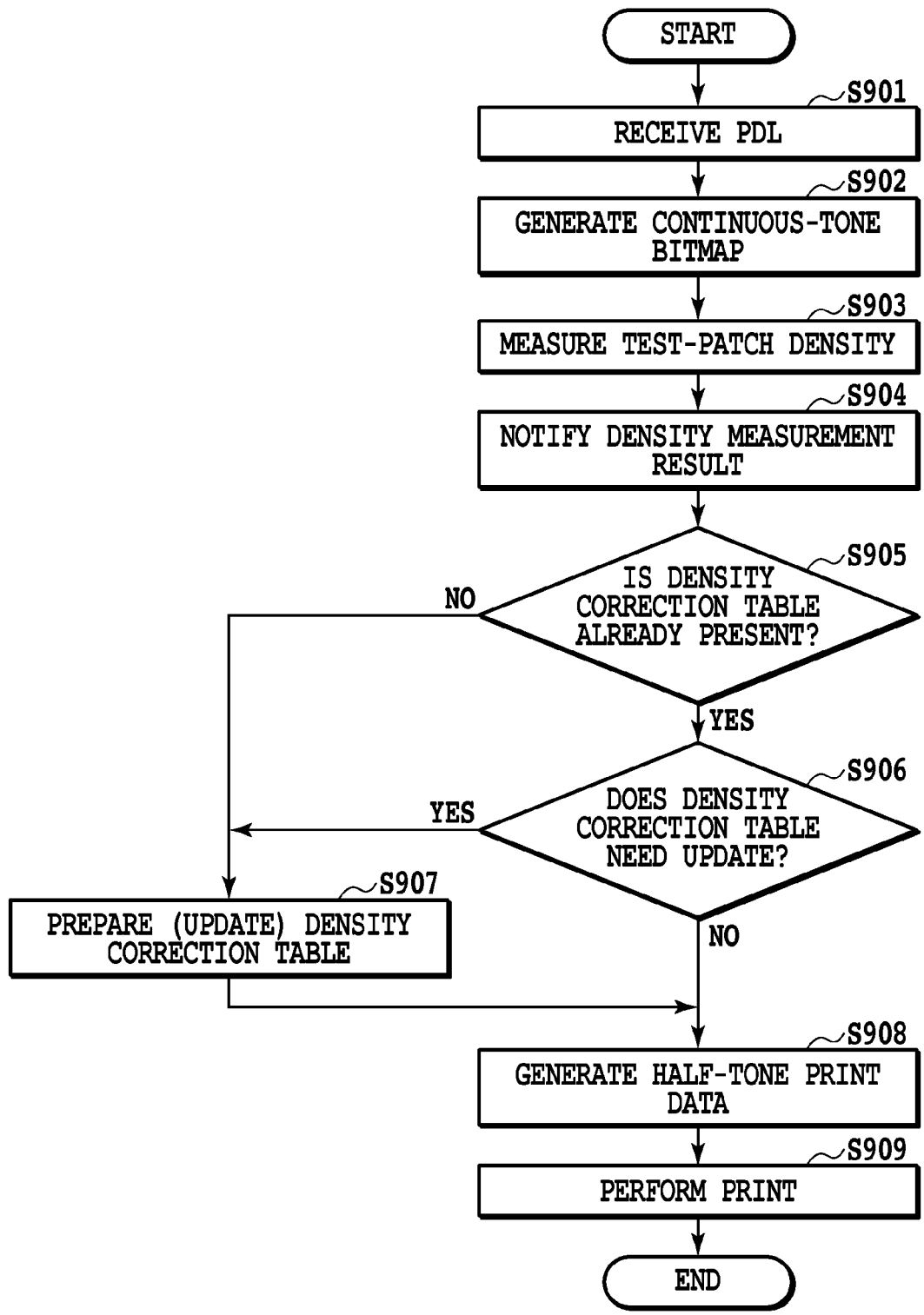
FIG. 9 is a diagram illustrating a flowchart of print operation control during the weak power-saving mode in the printer device, which is the embodiment of the present invention.

Subsequently, using FIG. 9, the print operation in the weak power-saving mode will be described in detail. A program of the printer device relating to this flow is stored in the ROM 205, read out to the RAM 206 and executed by the CPU 204.

The network I/F portion 207 receives the PDL, which is a print job, through the network 101 and temporarily stores it in the RAM 206 (S901). The rendering portion 208 analyzes the received PDL and generates image data, which is a continuous-tone bitmap (S902). Subsequently, the printer engine 202 performs density measurement of the above-described test patch (S903) and notifies the measured density result to the CPU 204 (S904). The CPU 204 prepares a new density correction table from the notified test-patch density result if the density correction table has not been prepared yet, that is, if print processing has not been executed before the current print operation (S907). If the density correction table has already been prepared (S905), the CPU 204 determines if the density correction table should be updated or not from the notified test-patch density result (S906). If it is determined that the density correction table should be updated, the density correction table is updated (S907). Also, if it is determined that the density correction table does not have to be updated from the notified test-patch density result, the existing density correction table that has been already prepared and stored in the RAM 206 is used. Subsequently, the print-data generation portion 210 uses the above-described density correction table to generate half-tone print data from the continuous-tone bitmap by half-tone processing such as dithering or error diffusion processing after correction the density (S908). If the continuous-tone bitmap is made up of 8 bits, the half-tone bitmap is made up of data with 1 bit or 2 bits, for example. The printer engine I/F portion 211 transmits the half-tone print data to the printer engine 202, while the printer engine 202 executes print processing according to the half-tone print data.

Subsequently, a print operation in the strong power-saving mode in which the received print job is stored for a predetermined period, which is a characteristic part of this embodiment, will be described in detail using FIGS. 10, 11, and 12. A program of the printer device relating to this flow is stored in the ROM 205, read out into the RAM 206, and executed by the CPU 204.

Figure 10:
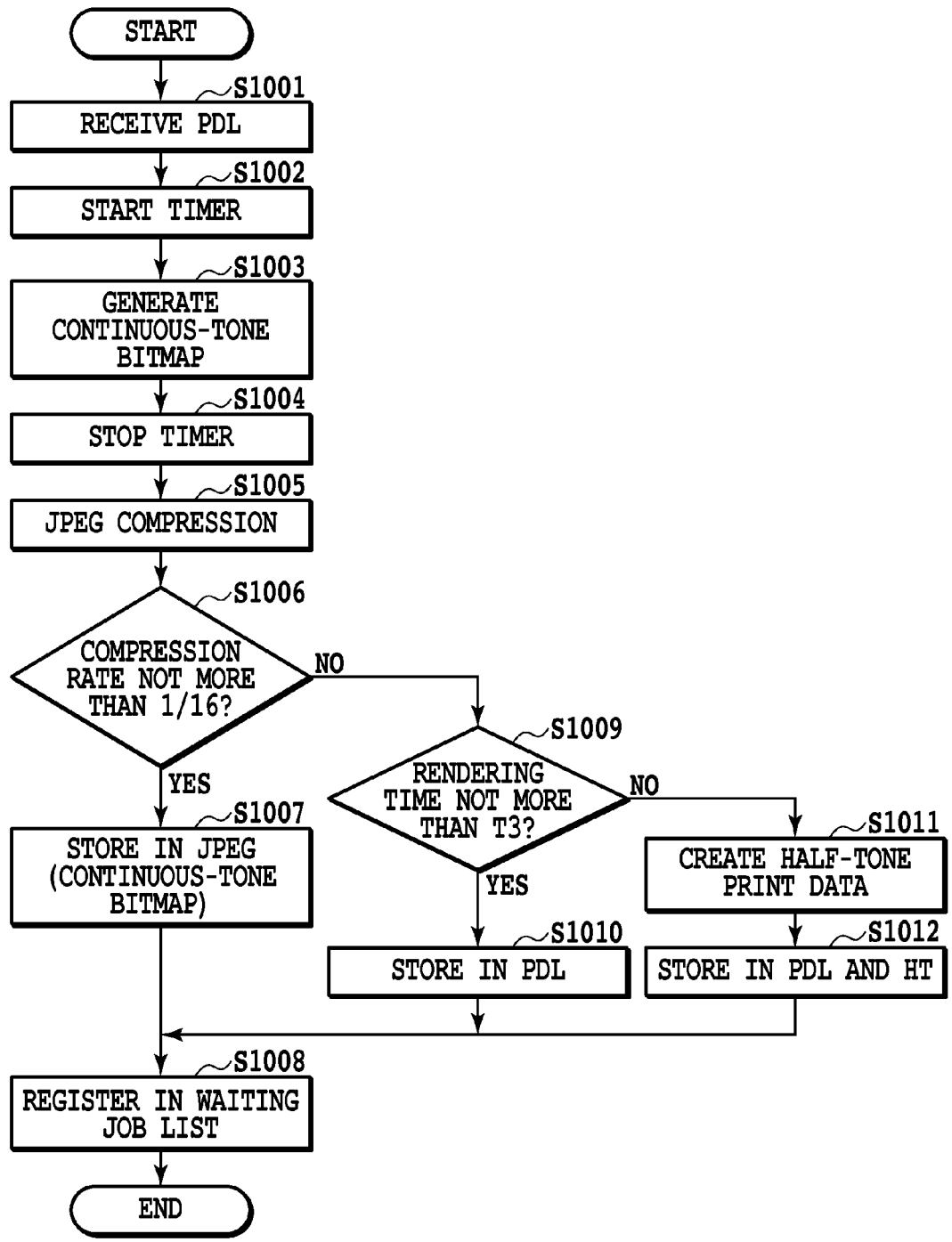
FIG. 10 is a diagram illustrating a flowchart of print waiting job management during the strong power-saving mode in the printer device, which is the embodiment of the present invention.

FIG. 10 is a flowchart relating to job management of the received print job in the strong power-saving mode. The network I/F portion 207 receives the PDL, which is the print job, through the network 101 and temporarily stores it in the RAM 206 (S1001: PDL data reception processing). Subsequently, the CPU 204 starts a timer in order to measure time required for the rendering processing (S1002). The rendering portion 208 analyzes the received PDL and generates image data (continuous-tone bitmap image), which is a continuous-tone bitmap (S1003). The CPU 204 stops the above-described timer and obtains processing time required for the rendering processing (S1004).

Subsequently, the compression/expansion portion 209 JPEG-compresses the continuous-tone bitmap generated by the rendering portion 208 (S1005). The CPU 204 acquires a compression rate from the data size of the continuous-tone bitmap before compression and the data size of the JPEG after the compression. The compression rate can be obtained from the following calculation formula:

$$\text{Compression rate} = \text{data size after compression} / \text{data size before compression}$$

The CPU 204 determines if the compression rate is not more than a predetermined value (the value is 1/16 in this embodiment but it is determined by a memory amount of the entire device) (S1006). If the compression rate is not more than 1/16, that is, the compressed image data requiring a small memory usage is generated, the CPU 204 stores this print job in the RAM 206 as the JPEG compressed data (S1007: first storing processing). Then, this print job is registered in a print waiting job list (S1008). The print waiting job list is a list showing at least information that identifies the print job and a data saving format associated with the print job. In this embodiment, a common compression parameter is used for each continuous-tone bitmap. Therefore, an example of a case in which data can be compressed efficiently, that is, the compression rate is not more than the predetermined value (not more than a first threshold value) can be a case in which several black characters are simply described on white background. On the contrary, in the case of a photograph obtained by taking an irregular and detailed scene, the compression rate is expected to exceed the predetermined value.

If the compression rate exceeds 1/16 at S1006, that is, if compression data requiring a large memory usage, it is determined if the time required for the rendering processing is shorter than a predetermined time (T3) or not (S1009). That is, it is determined if the time for rendering processing measured from S1002 to S1004 is shorter than T3 or not. This time T3 (second threshold value) is time required for printing one page by the print engine. That is because if the time required for the rendering processing is shorter than the time required for printing one page by the print engine, no rendering waiting time is generated even if the PDL is rendered again during the print processing. Exceptionally, as for the first page of the first job in the jobs received during a predetermined time for storing the print job, since the rendering waiting time is not generated during print output, even if the time is longer than T3, the PDL may be stored. T3 becomes 60/20=3 [seconds/sheet] if the print speed of the print engine is 20 sheets per minute, for example. If the time required for the rendering processing is not more than T3 (3 seconds in this embodiment from the above explanation) (not more than the second threshold value) (S1009), rendering can be performed from the PDL again in a short time. Thus, the CPU 204 stores the print job in PDL in the RAM 206 (S1010: second storing processing) and registers it in the waiting job list (S1008). If time required for the rendering processing is not less than T3 (S1009), the half-tone print data is generated from the continuous-tone bitmap by half-tone processing such as dithering or error diffusion processing after correction the density using the current density correction table (S1011). Then, the print job is held in two types of formats, that is, the PDL and the half-tone print data (HT) (S1012: third storing processing). Also, if the half-tone print data is to be held, information on which density correction table is used for generation is also held. After that, the job is registered in the waiting job list (S1008). The waiting job list is generated and managed by the CPU 204 and is made into a list of data including print setting and stored data format of the print job and a storage region of the stored data in the order of effectiveness and is stored in the RAM 206.

Figure 11:
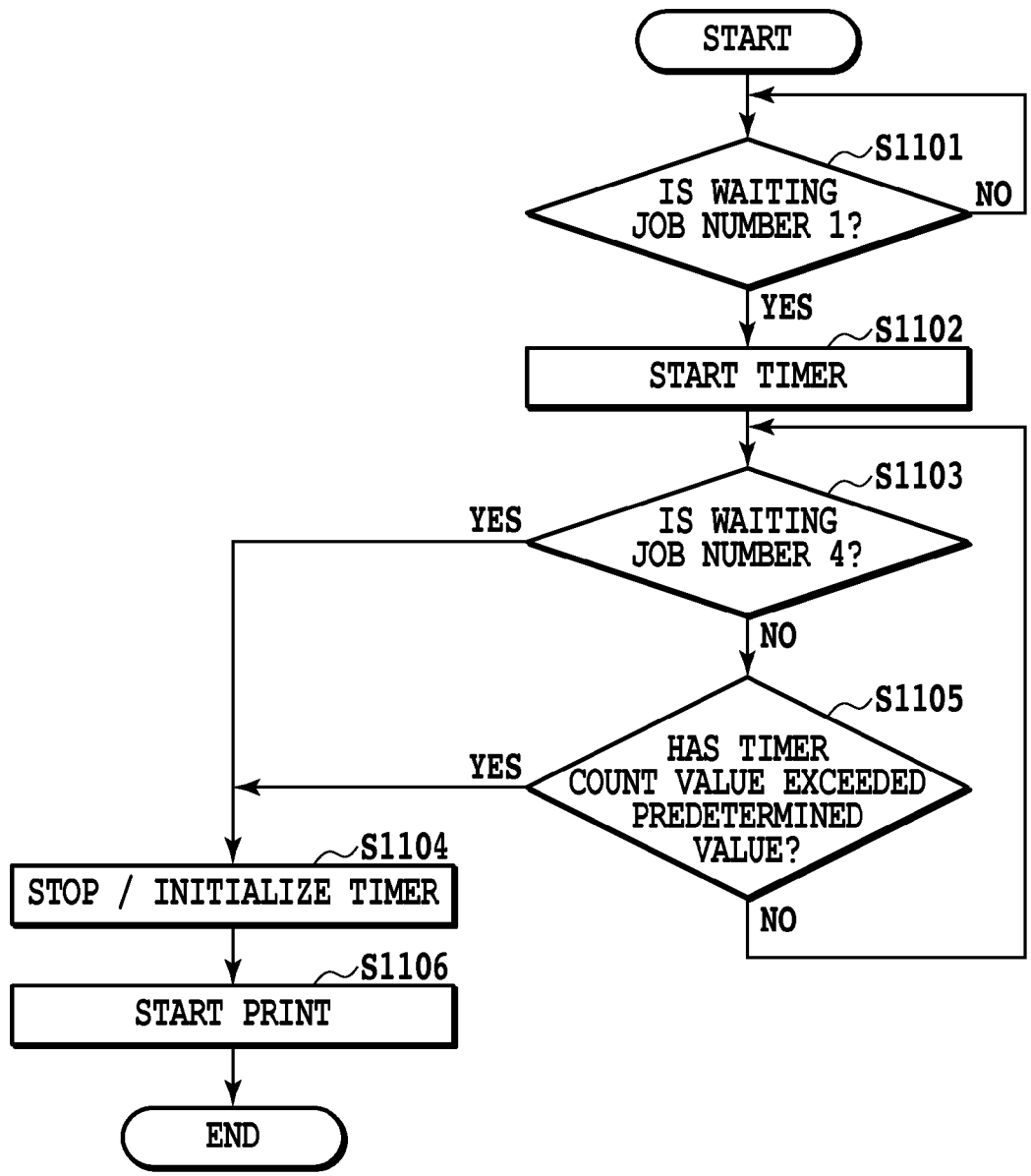
FIG. 11 is a diagram illustrating a flowchart of print operation start control during the strong power-saving mode in the printer device, which is the embodiment of the present invention.

FIG. 11 shows a control flow of start timing of the print processing operation in the strong power-saving mode. The CPU 204 starts the timer (S1102) when the number of print waiting jobs becomes 1 (S1101). This timer is a timer for measuring time during which pre-heating is off in power-saving. Subsequently, the CPU 204 determines if the waiting job number has reached 4 or not (S1103). This value is determined by a mounted memory amount of the print device. Moreover, it is determined if the timer value has reached a predetermined value or not (S1105). This timer value corresponds to T2 in FIG. 8 and it is 5 minutes in this embodiment. This value can be varied by a user and set from an operation portion, not shown. The CPU 204 stops/initializes the timer if either of conditions, that is, the waiting job number has reached 4 or the timer value has reached 5 minutes, is satisfied (S1104) and then, starts the print processing operation (gives a print start instruction).

FIGS. 12A and 12B indicate flowchart of print processing operation control in the strong power-saving mode. The printer engine 202 performs the above-described density characteristics measurement of the test patch (S1201) and notifies a measured density result to the CPU 204 (S1202). If a density correction table has not been prepared yet (S1203), that is, if the print processing has not been executed before the current print operation, the CPU 204 prepares a new density correction table from the notified test-patch density result (S1205). If the density correction table has been already prepared (S1203), it is determined if the density correction table should be updated or not from the notified test-patch density result (S1204). If it is determined that the density correction table should be updated, the density correction table is updated (S1205). Also, if it is determined that the density correction table does not have to be updated from the notified test-patch density result, the existing density correction table already prepared and stored in the RAM 206 is used. The density correction is made in each print start operation of each print waiting job.

The CPU 204 refers to the waiting job list and if the job to be currently executed for print is a JPEG-stored job (S1206), the compression/expansion portion 209 expands the JPEG data and generates a continuous-tone bitmap (S1207). Subsequently, the print-data generation portion 210 corrects the density of the generated continuous-tone bitmap by using the density correction table, then, generates half-tone print data whose density is corrected by performing the half-toning processing (S1208) and performs print using the generated half-tone print data (S1209). If the storage format of the waiting job is not JPEG data but only PDL data in the determination at S1206, the rendering portion 208 renders the PDL and generates the continuous-tone bitmap (S1213: first rendering processing). Subsequently, the print-data generation portion 210 corrects the density of the generated continuous-tone bitmap by using the density correction table, then, generates half-tone print data whose density is corrected by performing the half-toning processing (S1208; half-tone print data output processing) and performs print (S1209).

Subsequently, if the waiting job is not the PDL data only in the determination at S1212, that is, a case in which data is stored in the two types of formats, that is, the half-tone print data and the PDL, will be explained. The CPU 204 determines if the current density correction table is the same as the density correction table used when the held half-tone print data was created or not (S1214). This determination is made by referring to identification information, update time and the like of the density correction table. If the density correction table has not been updated, no environmental fluctuation has occurred since generation of the half-tone data, and the held half-tone print data is transmitted to the print engine as data to be printed, and print is performed (S1209). If the density correction table has been updated, the environmental fluctuation has occurred since the creation of the held half-tone data, and tincture variations caused according to the environmental fluctuation cannot be absorbed if the held half-tone print data is used. Therefore, the rendering portion 208 generates continuous-tone bitmap by rendering the held PDL (S1213: second rendering processing). Subsequently, the print-data generation portion 210 newly generates half-tone print data whose density is corrected from the generated continuous-tone bitmap (S1208: half-tone print data output processing) and performs print (S1209). After that, the CPU 204 deletes the target job from the waiting job list and updates it (S1210). The above-described processing flow is repeatedly performed until the number of waiting jobs after update becomes 0.

Through the above procedures, the job waiting for print can be stored in the optimal format, and while a storage capacity during storage is reduced, performance in print can be improved.

In this embodiment, the print-job waiting processing in which a job is spooled for a predetermined period of time with the purpose of energy saving was explained as an example. However, it is needless to say that the present invention can be applied to a printer device that can store a plurality of received print jobs for a predetermined period of time even for the purpose other than energy saving. For example, in order to keep confidentiality of print documents, the present invention can be applied to a print device in which the printing processing is not started immediately after reception of a print job but the print-job waiting processing is performed and then, the print operation is executed on a sheet by an authentication operation by password input of a user and the like.

In the above-described example, the case in which the density measurement processing is performed at each print job was explained. However, there can be a case in which a job to print a plurality of pages is present in one print job, for example, and the present invention can be also applied to such a case. For example, the present invention can be applied to a case of density measurement every ten pages or a case of density measurement every page. In this case, as for the job management flow shown in FIG. 10, for example, the compression rate of each page can be determined by measuring the timer when the continuous-tone bitmap is generated for each page. Also, if the compression rate on the second to fourth pages is not more than a predetermined value in the PDL to be printed on ten pages, for example, it is possible that the second to fourth pages are JPEG-compressed, respectively, while the remaining pages are held in the PDL. In this case, it is possible to store the PDL data by re-generating the PDL excluding the processed portions on the second to fourth pages. Also, by providing a management table for each page similarly to the waiting job list so as to store information on which page is JPEG-compressed or the like, the format in which the data is held during the print processing can be appropriately determined. Therefore, the term of the above-described "job" includes not only a job used in a usual meaning but also a concept of "each page" included in the job.

Also, in the above-described example, the case of compression/expansion in the JPEG format was explained, but the continuous-tone bitmap can be compressed/expanded in other compression formats.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-253061, filed Nov. 4, 2009, which is hereby incorporated by reference herein in its entirety.

What is claimed is:

1. An image forming apparatus comprising:
    a Page Description Language (PDL) data receiving unit configured to receive PDL data;
    a rendering unit configured to analyze the received PDL data and to generate a continuous-tone bitmap image;
    a time measuring unit configured to measure processing time of the rendering unit;
    a compression unit configured to compress the generated continuous-tone bitmap image and to output compressed image data;
    a first storing unit configured to store the compressed image data as a print waiting job if a compression rate of the outputted compressed image data is not more than a first threshold value;
    a second storing unit configured to store the PDL data as a print waiting job if the compression rate of the outputted compressed image data exceeds the first threshold value and if processing time measured by the time measuring unit is not more than a second threshold value; and
    a third storing unit configured to store a generated half-tone print data whose density is corrected from the continuous-tone bitmap image according to a measurement result of density characteristics of a printer engine and the PDL data as the print waiting job if the compression rate of the outputted compressed image data exceeds the first threshold value and if the processing time measured by the time measuring unit exceeds the second threshold value.

2. The image forming apparatus according to claim 1, wherein the second threshold value is time required for a print engine to print one page.

3. An image forming apparatus that can store a plurality of print jobs as print waiting jobs comprising:
    a receiving unit configured to receive a print start instruction of the print waiting job;
    a density characteristics measuring unit configured to measure density characteristics of a printer engine at each print start operation of each of the print waiting jobs;
    an expanding unit configured to expand compressed image data and to output a continuous-tone bitmap image if the compressed image data is held as the print waiting job;
    a first rendering unit configured to analyze PDL (Page Description Language) data and to generate the continuous-tone bitmap image if only the PDL data is held as the print waiting job;
    a second rendering unit configured to analyze the PDL data and to generate the continuous-tone bitmap image if the PDL data and half-tone print data whose density is corrected are held as the print waiting job and if the density characteristics measured by the density characteristics measuring unit does not match the density characteristics used when the half-tone print data was generated;
    a half-tone print data outputting unit configured to output the held half-tone print data whose density is corrected as data to be printed if the PDL data and the half-tone print data whose density is corrected are held as the print waiting job and if the density characteristics measured by the density characteristics measuring unit matches the density characteristics used when the half-tone print data was generated;

a half-tone print data generating unit configured to generate half-tone print data whose density is corrected according to a measurement result of the density characteristics measured by the density characteristics measuring unit from the continuous-tone bitmap image generated by the first rendering unit or the second rendering unit; and a print processing unit configured to perform print processing using the half-tone print data whose density is corrected, the half-tone print data being generated by the half-tone print data generating unit or being outputted from the half-tone print data outputting unit.

4. A control method of an image forming apparatus comprised of first, second and third storage units for storing a print waiting job, the method comprising:

receiving step for receiving Page Description Language (PDL) data;

rendering step for analyzing the received PDL data and to generate a continuous-tone bitmap image;

time measuring step for measuring processing time of the rendering step;

compressing step for compressing the generated continuous-tone bitmap image and to output compressed image data;

determining whether to perform a first storing step, a second storing step or a third storing step based on the time measuring step and the compressing step, wherein the determining step determines to perform the first storing step of storing in the first storage unit the compressed image data as the print waiting job if a compression rate of the outputted compressed image data is not more than a first threshold value;

wherein the determining step determines to perform the second storing step of storing in the second storage unit the PDL data as the print waiting job if the compression rate of the outputted compressed image data exceeds the first threshold value and if the processing time measured by the time measuring step is not more than a second threshold value; and wherein the determining step determines to perform the third storing step of storing in the third storage unit a generated half-tone print data whose density is corrected from the continuous-tone bitmap image according to a measurement result of density characteristics of a printer engine and the PDL data as the print waiting job if the compression rate of the outputted compressed image data exceeds the first threshold value and if the processing time measured by the time measuring step exceeds the second threshold value.

5. The control method of an image forming apparatus according to claim 4, wherein the second threshold value is time required for a print engine to print one page.

6. A control method of an image forming apparatus that can store a plurality of print jobs as print waiting jobs, comprising:

receiving step for receiving a print start instruction of the print waiting job;

measuring step for measuring density characteristics that measures density characteristics of a printer engine in each print start operation of each of the print waiting jobs;

expanding step for expanding the compressed image data and outputting a continuous-tone bitmap image if the compressed image data is held as the print waiting job;

determining whether to perform a first rendering step or a second rendering step based on the measuring step and the expanding step, wherein the determining step determines to perform the first rendering step for analyzing PDL (Page Description Language) data and to generate the continuous-tone bitmap image if only the data is held as the print waiting job, and wherein the determining step determines to perform the second rendering step for analyzing the PDL data and to generate the continuous-tone bitmap image if the PDL data and half-tone print data whose density is corrected are held as the print waiting job and if the density characteristics measured by the density characteristics measuring step does not match the density characteristics used when the half-tone print data was generated;

outputting step for outputting the held half-tone print data whose density is corrected as data to be printed if the PDL data and the half-tone print data whose density is corrected are held as the print waiting job and if the density characteristics measured by the density characteristics measuring step matches the density characteristics used when the half-tone print data was generated;

generating step for generating half-tone print data whose density is corrected according to a measurement result of the density characteristics measured by the density characteristics measuring step from the continuous-tone bitmap image generated by the first rendering step or the second rendering step; and print processing step for performing print using the half-tone print data whose density is corrected, the half-tone print data being generated by the half-tone print data generating step or being outputted from the half-tone print data outputting step.

7. A non-transitory computer-readable recording medium that makes a computer execute a control method of an image forming apparatus comprised of first, second and third storage units for storing a print waiting job, the control method comprising:

receiving step for receiving Page Description Language (PDL) data;

rendering step for analyzing the received PDL data and to generate a continuous-tone bitmap image;

time measuring step for measuring processing time of the rendering step;

compressing step for compressing the generated continuous-tone bitmap image and to output compressed image data;

determining whether to perform a first storing step, a second storing step or a third storing step based on the time measuring step and the compressing step, wherein the determining step determines to perform the first storing step of storing in the first storage unit the compressed image data as the print waiting job if a compression rate of the outputted compressed image data is not more than a first threshold value;

wherein the determining step determines to perform the second storing step of storing in the second storage unit the PDL data as the print waiting job if the compression rate of the outputted compressed image data exceeds the first threshold value and if the processing time measured by the time measuring step is not more than a second threshold value; and wherein the determining step determines to perform the third storing step of storing in the third storage unit a generated half-tone print data whose density is corrected from the continuous-tone bitmap image according to a measurement result of density characteristics of a printer engine and the PDL data as the print waiting job if the compression rate of the outputted compressed image data exceeds the first threshold value and if the processing time measured by the time measuring step exceeds the second threshold value.

8. A non-transitory computer-readable recording medium that makes a computer perform a control method of an image forming apparatus that can store a plurality of print jobs as print waiting jobs, the control method comprising:

receiving step for receiving a print start instruction of the print waiting job;

measuring step for measuring density characteristics that measures density characteristics of a printer engine in each print start operation of each of the print waiting jobs;

expanding step for expanding the compressed image data and outputting a continuous-tone bitmap image if the compressed image data is held as the print waiting job;

determining whether to perform a first rendering step or a second rendering step based on the measuring step and the expanding step, wherein the determining step determines to perform the first rendering step for analyzing PDL (Page Description Language) data and to generate the continuous-tone bitmap image if only the data is held as the print waiting job, and wherein the determining step determines to perform the second rendering step for analyzing the PDL data and to generate the continuous-tone bitmap image if the PDL data and half-tone print data whose density is corrected are held as the print waiting job and if the density characteristics measured by the density characteristics measuring step does not match the density characteristics used when the half-tone print data was generated;

outputting step for outputting the held half-tone print data whose density is corrected as data to be printed if the PDL data and the half-tone print data whose density is corrected are held as the print waiting job and if the density characteristics measured by the density characteristics measuring step matches the density characteristics used when the half-tone print data was generated;

generating step for generating half-tone print data whose density is corrected according to a measurement result of the density characteristics measured by the density characteristics measuring step from the continuous-tone bitmap image generated by the first rendering step or the second rendering step; and print processing step for performing print using the half-tone print data whose density is corrected, the half-tone print data being generated by the half-tone print data generating step or being outputted from the half-tone print data outputting step.

* * * * *